US010216507B1

(12) United States Patent
Falcone et al.

(10) Patent No.: US 10,216,507 B1
(45) Date of Patent: *Feb. 26, 2019

(54) CUSTOMIZED APPLICATION PACKAGE WITH CONTEXT SPECIFIC TOKEN

(71) Applicant: Twitter, Inc., San Francisco, CA (US)

(72) Inventors: Andrea S. Falcone, Waltham, MA (US); Peter W. Hopkins, Cambridge, MA (US); Sanford W. Phillips, Somerville, MA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,696

(22) Filed: Apr. 24, 2017

Related U.S. Application Data

(63) Continuation of application No. 14/669,887, filed on Mar. 26, 2015, now Pat. No. 9,632,765.

(51) Int. Cl.
G06F 9/445 (2018.01)
G06F 8/61 (2018.01)
H04L 29/08 (2006.01)
G06F 17/30 (2006.01)
H04L 12/26 (2006.01)

(52) U.S. Cl.
CPC ............... G06F 8/61 (2013.01); G06F 9/445 (2013.01); G06F 17/30 (2013.01); G06F 17/30153 (2013.01); H04L 29/08 (2013.01); H04L 43/06 (2013.01); H04L 67/1095 (2013.01)

(58) Field of Classification Search
CPC . G06F 8/61; G06F 9/445; G06F 17/30; G06F 17/30153; H04L 29/08; H04L 43/06; H04L 67/1095
USPC .................................................. 717/168-178
See application file for complete search history.

(56) References Cited

U.S. PATENT DOCUMENTS 8,271,792 B2 9/2012 Segawa
9,632,765 B1 * 4/2017 Falcone .................... G06F 8/61
2006/0005234 A1 1/2006 Birk

OTHER PUBLICATIONS

Mkyong, "Spring Security Custom Login Form Example", Apr. 2014, retrieved from Mkyong.com, 17 pages.*

(Continued)

Primary Examiner — Ted T. Vo
(74) Attorney, Agent, or Firm — Fish & Richardson P.C.

(57) ABSTRACT

A system and method including: receiving an initial application package including at least one binary file of an application; generating an application token, wherein the application token is operable to identify a context; and assembling a customized application package including the initial application package and the application token, wherein: the customized application package and the initial application package share a common hash value according to a predefined hashing algorithm, and the application can be configured based on the application token.

23 Claims, 7 Drawing Sheets

(56) References Cited

OTHER PUBLICATIONS

Studytrails, "Spring Security: Securing Methods Using @Secured Annotation", 2012, Retrieved from studytrails.com, 11 pages.*
Alex et al., "Spring Security Reference Documentation", Oct. 2013, retrieved from http://docs.spring.io/spring-security/site/docs/3.1.x/reference/springsecurity-single.html, in http://web.archive.org/web/20131012005059/, 128 pages.*
Mkyong, "Spring Security Remember Me Example", May 2014, retrieved from Mkyong.com, 16 pages.*
javacoffeebreak.com, "Q&A: How do I create a .JAR file?", 2012, retrieved from http://web.archive.org/web/20120107174650/http://javacoffeebreak.com/faq/faq0028.html, 1 page.

* cited by examiner

CUSTOMIZED APPLICATION PACKAGE WITH CONTEXT SPECIFIC TOKEN

CROSS REFERENCE TO RELATED APPLICATIONS

This application is a continuation of and claims priority to U.S. patent application Ser. No. 14/669,887, filed on Mar. 26, 2015, the entire contents of which are hereby incorporated by reference.

BACKGROUND

A computing device, such as a personal computer or a mobile device, may include functionality to execute/install an application package. The application package may be downloaded from a server using a communications network such as the Internet. The application package may include an installer to install the application package to the computing device.

The integrity of an application package may be verified by performing a check of a hash value associated with the application package. The application package may be identified as genuine if the hash value calculated matches a predefined hash value. On the other hand, the application package may be identified as non-genuine if the hash value calculated does not match the predefined hash value.

SUMMARY

In general, in one aspect, the invention relates to a method that may include: receiving an initial application package including at least one binary file of an application; generating an application token, where the application token is operable to identify a context; and assembling a customized application package including the initial application package and the application token, where: the customized application package and the initial application package share a common hash value according to a predefined hashing algorithm; and the application can be configured based on the application token.

In general, in one aspect, the invention relates to a system that may include: a computer processor; and an assembler module executing on the computer processor and configured to enable the computer processor to: receive an initial application package including at least one binary file of an application, where the application includes functionality to perform context-specific functionality based on one or more tokens; generate an application token, where the application token is operable to identify a context; and assemble a customized application package including the initial application package and the application token, where: the customized application package and the initial application package share a common hash value according to a predefined hashing algorithm, and the application can be configured based on the application toke.

In general, in one aspect, the invention relates to a non-transitory computer-readable storage medium having instructions configured to execute on at least one computer processor to enable the computer processor to: receive a customized application package including a token and a binary file of an application, where the token is operable to identify a context; receive a validation hash value; calculate a verification hash value for the customized application package, where the verification hash value is unaffected by the token; determine that the validation hash value matches the verification hash value; authenticate the customized application package in response to determining that the validation hash value matches the verification hash value; install the application, based on the token, after authenticating; and execute the application in a context selected based on the token.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
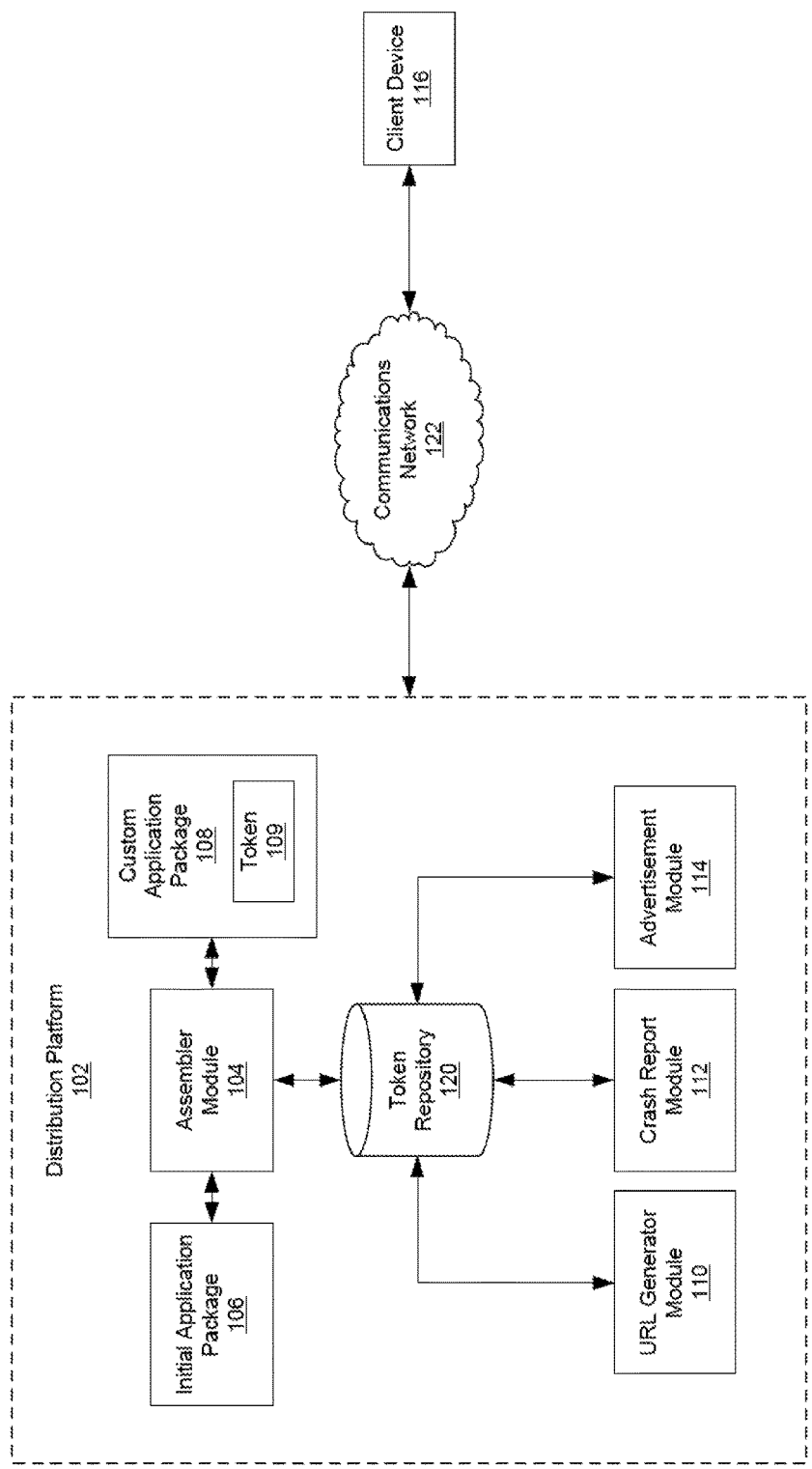
FIG. 1 shows a schematic diagram of a system, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for assembling a customized application package based on an initial application package and a token. The initial application package may be provided by a developer and/or distributor of an application. The token may identify a context for an application included in the customized application package. For example, the token may include identifying information related to a user. An assembler module may include functionality to receive the initial application package, which may include at least one binary file of an application. The assembler module may generate or receive a token that identifies a context and may assemble a customized application package including the initial application package and the token.

The customized application package (which includes the token) and the initial application package (which does not include the token) may share a common hash value according to a predefined algorithm. As a result, an installer may determine that the customized application package is unaltered as compared to the initial application package, based on the unmodified hash value.

In one or more embodiments, the application may include functionality to perform context-specific functionality based on the token. For example, the application may authenticate a user, auto-populate form fields, and/or identify an advertising context using the token provided within the customized application package. In one or more embodiments, an installer may include functionality to configure the application based on the token.

FIG. 1 shows a distribution platform 102 and a client device 116 in accordance with one or more embodiments of the invention. The distribution platform 102 and the client device 116 may be communicatively coupled, for example, through a communications network 122. As shown in FIG. 1, the distribution platform 102 may include multiple components including an initial package 106, an assembler module 104, a custom application package 108 with a token 109, a token repository 120, a URL generator module 110, a crash report module 112, and an advertisement module 114.

Various components of the distribution platform 102 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention. Although the distribution platform 102 is illustrated as only one computer system, it should be appreciated that this one computer system may represent many computer systems, arranged in a central or distributed fashion. For example, computer systems associated with the distribution platform 102 may be organized as a central cloud and/or may be distributed geographically or logically to edges of a system such as a content delivery network or other arrangement. It is understood that virtually any number of intermediary networking devices, such as switches, routers, servers, etc., may be used to facilitate communication.

Figure 2:
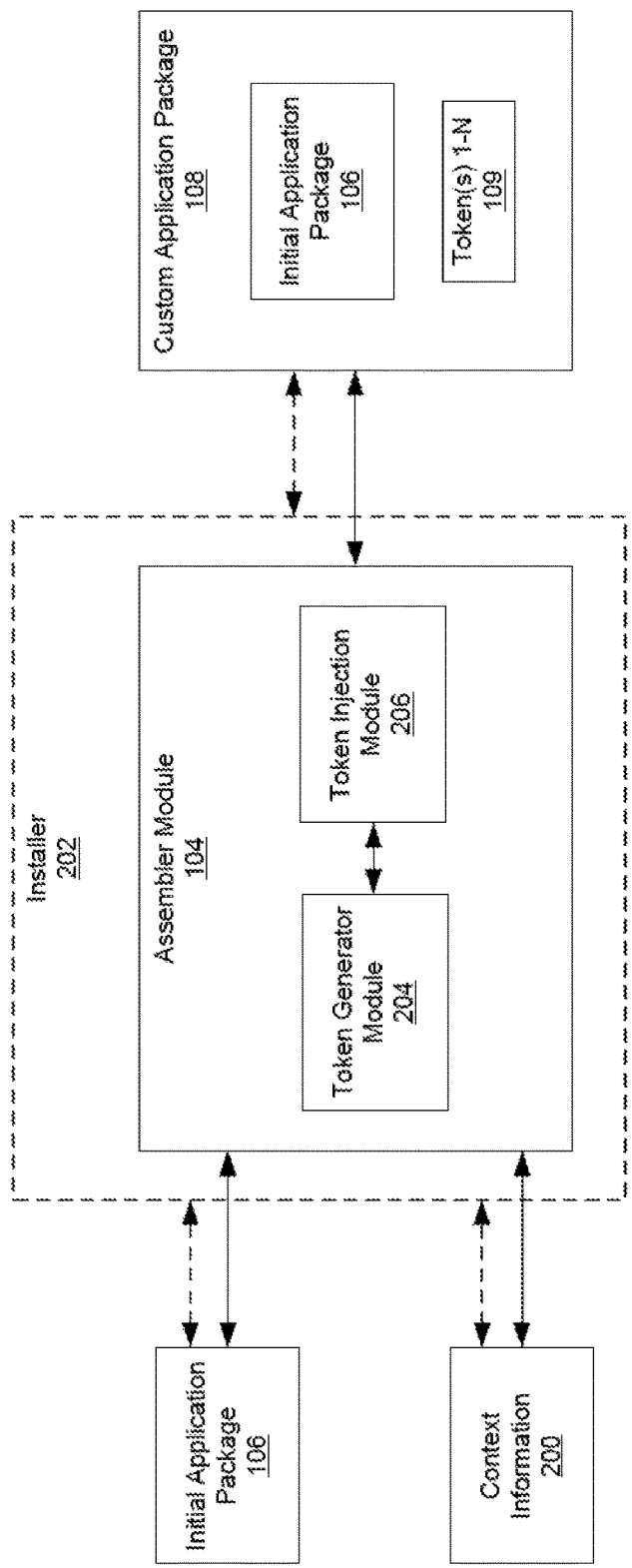
FIG. 2 shows a schematic diagram of an assembler module in accordance with one or more embodiments.

FIG. 2 shows a schematic diagram of the assembler module 104 in accordance with one or more embodiments. The assembler module 104 may include a token generator module 204 and a token injection module 206. An installer 202 may include the assemble module 104. The installer 202 may be a system/native or existing installer of the client device 116, an installer included in the initial application package 106, or an installer executing remotely (e.g., executing on the distribution platform 102).

In one or more embodiments, the assembler module 104 includes functionality to receive the initial application package 106. The initial application package may be provided by a developer and/or distributor of an application. The initial application package 106 may include at least one binary file of an application. The binary file may include any type of data represented in binary form for storage and/or processing purposes. The binary file may include an executable program of the application and/or an installer. The initial application package 106 may be generic such that the initial application package 106 does not include context-specific information (e.g., user identity, custom settings, and any other context-specific information). If the application is installed through the initial application package 106, the application may request context-specific information for manual input when executed. For example, the initial application package 106 may include functionality to request identification information, such as a user name and/or a password. A user may manually input the requested identification information. The manually inputted identification information may be used to authenticate the user and/or configure the application.

In one or more embodiments, the assembler module 104 includes functionality to generate a token 109 that may be used to identify a context. The assembler module 104 and/or token generator module 204 may include functionality to generate the token 109 (or multiple tokens 1-N) based at least in part on context information 200. The token generator module 204 may use a predefined algorithm to encode information associated with a user or a client device to generate the token 109. The information associated with the user or the client device may include, but is not limited to, preference information for a user, information associated with an image, information associated with an avatar, information associated with an icon, a reference to a location that includes information associated with a user, encrypted information, a name/value pair, human readable information, binary numbers, and/or hexadecimal characters. The token generator module 204 may include functionality to provide the generated token 109 to the token injection module 206.

In one or more embodiments, the assembler module 104 includes functionality to assemble a customized application package 108 including the initial application package 106 and the token 109. The token injection module 206 may include functionality to receive the tokens 109 from the token generator module 204. The assembler module 104 and/or token injection module 206 may include functionality to insert or include the token 109 in a location within the customized application package 108. For example, the location may be name information of an empty directory in the file structure of the customized application package 108. The token 109 may represent, describe, or convey the context information 200 using a string of characters in the name information of the empty directory. Because the existence or addition of an empty directory may not alter a hash value of a package according to a predefined hashing algorithm, the customized application package and the initial application package may share a common hash value, thereby avoiding package verification issues.

In one or more embodiments, the assembler module 104 includes functionality to identify a hash value of the initial application package. The hash value (e.g., a verification hash value) may be compared to a previously calculated hash value (e.g., a validation hash value) to ensure that the customized application package 108 will pass hash value verification tests (such as a verification of an installer prior to installing the customized application package 108). The assembler module 104 may check that the customized application package 108 and the initial application package 106 share a common hash value to verify that the customized application package 108 will pass the verification steps. The assembler module 104 and the installer may use the same hashing algorithm.

The assembler module 104 may receive the initial application package 106 in compressed form. The assembler module 104 may include functionality to decompress the initial application package 106 using a predefined decompression algorithm (for example, a Zip decompression algorithm) to access the initial application package's 106 file structure. After inserting the token 109, the assembler module 104 may include functionality to compress the resulting customized application package 108.

In one or more embodiments, the assembler module 104 and/or the distribution platform 102 include functionality to provide the customized application package 108. An assembler module 104 provided within the distribution platform 102 may receive context information 200 associated with the request, the user, an account, and/or the client device 116. The context information 200 may be received from the client device 116, the token repository 120, and/or a third party server.

In one or more embodiments, the installer 202 and/or client device 116 include functionality to receive the customized application package 108 including the token 109 and the binary file of the application. For example, the installer 202 and/or client device 116 may receive the customized application package 108 from the distribution platform 102 and/or the assembler module 104.

In one or more embodiments, the installer 202 and/or client device 116 include functionality to receive a validation hash value of the initial application package 106. For example, the validation hash value may be pre-calculated by the developer and/or distributor of the initial application package 106 and provided separately or alongside the initial application package 106. An installer may only allow an application package to be installed if a verification hash value calculated for the application package matches the validation hash value. The hash verification operation may be performed by the installer 212, an operating system (OS) of the client device 116, and/or any other application or module including functionality to verify a hash value. This verification may ensure that the application package is genuine, and does not include any corruptions or unauthorized modifications. By adding token 109 to the customized application package 108 such that the customized application package shares a common hash value with the initial application package 106, the customized application package 108 may be verified by the installer.

The validation hash value may be calculated by the distribution platform 102 and/or the assembler module 104. The distribution platform 102 or assembler module 104 may receive the validation hash value from a third party server. The distribution platform 102 may receive an initial application package 106 from a third party source, where the initial application package 106 incorporates the validation hash value therein.

In one or more embodiments, the distribution platform 102 stores the validation hash value. Multiple validation hash values associated with multiple application packages may be stored in a repository provided on the distribution platform 102. The distribution platform 102 may provide the validation hash value upon a request from the client device 116 or assembler module 104. The client device 116 may receive the initial application package 106 along with the validation hash value from the distribution platform 102. The validation hash value may be incorporated within the initial application package 106.

In one or more embodiments, the installer 202 and/or client device 116 include functionality to calculate a verification hash value for the customized application package 108. The hash value may be unique (or almost unique) to a particular application package. The hash value may be based on files, directories, subdirectories, and/or other properties of the application package. Modifications to the application package may result in a change in the hash value. The hash value may be calculated using known hashing algorithms, for example cyclic redundancy check (CRC), MD5, or SHA-1. In one or more embodiments, the predefined hashing algorithm is a cryptographic hash function based on a message-digest algorithm. For example, the message-digest algorithm may be an MD5 algorithm that generates a 128-bit hash value for verification of data integrity.

In one or more embodiments, the installer 202 and/or client device 116 include functionality to determine that the validation hash value matches the verification hash value. For example, the installer 202 and/or client device 116 may compare the validation hash value and the verification hash value to make the determination.

In one or more embodiments, the installer 202 and/or client device 116 include functionality to authenticate the customized application package in response to determining that the validation hash value matches the verification hash value. After authentication, the installer 202 and/or client device 116 may be allowed to install and/or execute the application.

In one or more embodiments, the installer 202, the application, the client device 116, and/or the distribution platform 102 include functionality to install the application, based on the token 109, after authentication. For example, the application can be configured based on the token 109. As a result, the token 109 may allow the application to be configured based on the context information 200. For example, during an installation operation, the installer 202 may preconfigure the application based on the token 109. In another example, during execution, the application may access the token 109 to configure the application. In another example, the distribution platform 102 may access the token 109 to configure the application.

It may be advantageous to preconfigure the customized application package 108 to avoid inconvenience to the user and inadvertent configuration mistakes. Accordingly, requests to the user and/or to configure the application may be minimized. The token 109 may be used to preconfigure the application to identify a user, identify a client device, authenticate a user, authenticate a client device, detect an advertisement conversion, fetch parameters, auto-populate fields, and/or any other parameter that may be configured.

The token 109 may include a reference that may be used to determine a location that includes information associated with the user, which may be used during execution or installation to facilitate application configuration. For example, the token 109 may include a URL reference, a reference to another application that allows the installer 202 to retrieve information associated with the user. It may be advantageous for the installer 202 to retrieve this information to avoid having the user manually enter information that is automatically accessible on the client device 116.

In one or more embodiments, the initial application package 106 includes the installer 202. For example, the installer 102 may be included alongside the application in the initial application package 106. The installer 102 may include functionality to install the application and configure the application based on the token 109. In one or more embodiments, the assembler module 104 includes functionality to generate an installer token, where the installer token represents context information, and assemble the customized application package with the installer token included. The installer 102 may include functionality to install the application and configure the application based on the installer token. The installer 102 may also include functionality to install other applications and configure those applications based on the installer token. The token may include identification information of the user, an advertising context, and/or installation parameters for the application package. For example, the customized installer may receive installation parameters, such as installation location, permissions, or application settings from the token.

In one or more embodiments, the client device 116 includes the assembler module 104, initial application package 106, and/or custom application package 108. The assembler module 104 of the client device 116 may be communicatively coupled with the token repository 120, the URL generator module 110, the crash report module 112, and/or the advertisement module 114 of the distribution platform 102.

In one or more embodiments, the installer 202 includes the assembler module 104. The installer 202, and thereby the assembler 104, include functionality to receive the initial application package 106 from the distribution platform 102. Additionally, the assembler module 104 may receive context information 200 associated with the request, the user, an account, and/or the client device 116. The context information 200 may be provided by the distribution platform 102, the token repository 120, a third party server, or a memory of the client device 116.

In one or more embodiments, the assembler module 104 is external to the installer 202, such as elsewhere within the client device 116 and/or within the distribution platform 102. The installer 202 may include functionality to execute the assembler module 104 locally and/or through the communications network 122. The assembler module 104 and/or the distribution platform 102 may include functionality to provide the initial application package 106 and context information 200 to the installer 202.

In one or more embodiments, the initial application package 106 includes one or more applications and/or one or more installers. The token injection module 206 may include functionality to insert the tokens 1-N 109 within the file structure of one or more of the applications, one or more of the installers, and/or elsewhere in the file structure of the initial application package 106.

In one or more embodiments, the URL generator module 110 includes functionality to generate a unique URL associated with the token 109. The association between the URL and the token 109 may be stored (e.g., in the token repository 120). The URL may facilitate retrieval of the application by a user associated with the token 109.

For example, a unique URL may be provided to one or more users. Because each URL is unique, the URL generator module can track which URLs, and thereby which users, activated the URLs. For example, the URL generator module 110 may generate a custom download URL such as examplesite.com/app.pkg&tracking=John for user "John" and examplesite.com/app.pkg&tracking=Jane for user "Jane". If the URL examplesite.com/app.pkg&tracking=Jane were activated, the URL generator module 110 could determine that user Jane likely activated the URL.

In one or more embodiments, the URL generator module 110 includes functionality to log an application download request via the URL (e.g., in the token repository 120). The distribution platform 120 may include functionality to perform analytics based on the log. The analytics may be related to user behavior, application download rates, advertisement conversions, etc. The analytics may be related to user behavior, application download rates, advertisement conversions, etc. The token could also include context information facilitating customized new user onboarding flow, including user specific information, facilitating custom advertising, customizing a social graph of recommended accounts, tracking advertising conversion analysis, and so on.

In one or more embodiments, the distribution platform 120 may include functionality to, in response to receiving an application download request, provide the customized application package for installation with the associated token.

In one or more embodiments, the URL generator module 110 includes functionality to receive an application download request via a unique Universal Resource Locator (URL) associated with the token 109. The application download request may be provided by a user of a client device 116. The URL receiver module may include functionality to associate the user with the token 109 using the URL.

In one or more embodiments, the advertisement module 114 and/or application includes functionality to identify an advertisement impression or conversion by the user associated with the token 109. The client device 116 may report an advertisement impression when an advertisement is viewed in the application configured based on the token 109. The advertisement module 114 may receive the report with the token 109 or a reference to the token 109. As a result, the advertisement module 114 can determine which user viewed or engaged with the advertisement (e.g., by looking up the user associated with the token in the token repository 120). The advertisement module 114 may store information related to the impression in the token repository 120. The report and/or token 109 may indicate a context for the impression/conversion. For example, the advertisement data may include the type of advertisement, the type of device used, the website or application in which the advertisement was placed, and/or any other information about the impression/conversion.

In one or more embodiments, the advertisement module 114 includes functionality to provide a targeted advertisement using the token 109. The advertisement module 114 may receive contextual information associated with the token 109, such as user information, device information, and/or behavior information. The advertisement module 114 may use the contextual information to determine a targeted advertisement to provide to the user. The targeted advertisement may be an advertisement determined to be relevant to the user and/or likely to receive a response from the user. The advertisement module 114 may receive analytics from the distribution platform 102 and/or a third party server to identify an advertisement relevant to the user and/or likely to receive a response from the user. The analytics may be performed using the token 109. For example, the user's browsing history and behavior may be associated with the token 109 stored in the token repository 120. The user's browsing history and behavior may be used to determine targeted advertisements.

In one or more embodiments, the crash report module 112 includes functionality to receive a crash report from a client device 116. The crash report may include information associated with a crash event of the application, include or identify the token 109, and/or identify an account associated with the token 109. The information associated with a crash event may include data associated with the crash event, such as memory dumps, error codes, application information, operating system information, time, date, and/or system configurations.

In one or more embodiments, the client device 116 may include a crash reporter module including functionality to deliver the crash report and/or the token 109 to the crash report module 112. The token 109 may be incorporated within the crash report. In one or more embodiments, the application may include software tools such as a software development kit (SDK) to read the token 109 when a crash occurs and provide the token 109 and the crash report to the distribution platform 102 and/or the crash module 112.

The crash report module 112 may include functionality to log the crash report and/or the token 109 (e.g., in the token repository 120) for crash analytics. For example, the distribution platform 102 may store the log of crash reports in the token repository 120. The token repository 120 may associate the log of crash reports with a token, a user account, and/or a client device 116. The distribution platform 102 may include functionality to analyze, track, and determine relationships between crash reports based on entries of the token repository 120.

The token repository 120 may store the token 109 and related information. The token repository 120 may include a relational database (e.g., that may be accessible using SQL). The token repository 120 may associate user accounts and/or client devices 116 with context information. The token repository 120 may associate user accounts and/or client devices 116 with URL information, such as browsing history. The token repository 120 may associate user accounts and/or client devices 116 with advertisement information, such as advertisement conversion history. The token repository 120 may associate user accounts and/or client devices 116 with crash information, such as a log of crash reports.

Figures 3A, 3B:
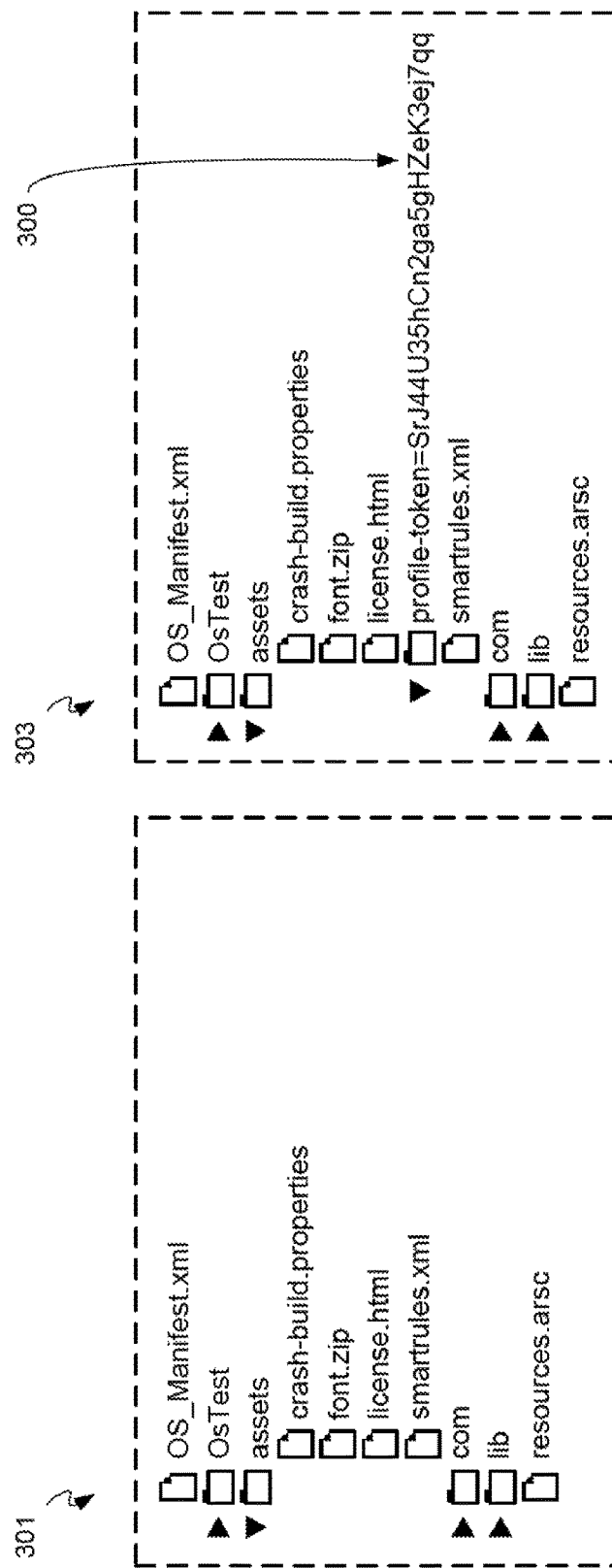
FIG. 3A shows an example of a visual representation of an initial application package in accordance with one or more embodiments.
FIG. 3B shows an example of a visual representation of a customized application package in accordance with one or more embodiments.

FIG. 3A shows an example of a visual representation of an initial application package in accordance with one or more embodiments. The initial application package 106 may include an initial file structure 301 with files, directories, subdirectories, etc. The initial application package 106 may include at least one binary file of an application. The initial application package 106 may include one or more applications and/or one or more installers.

FIG. 3B shows an example of a visual representation of a customized application package in accordance with one or more embodiments. The customized application package 108 may include a custom file structure 303 that partially or fully includes the initial file structure 301. In one or more embodiments, the token 300 is provided in the file structure of the customized application package 108. The token 300 may be inserted into any number of locations of the initial file structure 301. For example, the token 300 may be inserted into the root directory of the custom file structure 303, in a subdirectory of the initial file structure 301, or outside the initial file structure 301.

In one or more embodiments, the assembler module 104 includes functionality to create an empty directory in the file structure of the customized application package 108 and include the token 300 in name information of the empty directory. The empty directory may be created in the root directory of the customized application package 108, any subdirectory, and/or the file structure of the initial application package 106. In one or more embodiments, the assembler module 104 includes functionality to rename an empty directory in the file structure of the customized application package 108 to include the token 300 in name information of the empty directory. For example, the assembler module 104 may rename an existing directory included in the initial application package 106 to include the token 300 in its name information. By inserting the token 300 in the name information of the existing directory, a new empty directory would not have to be created.

In one or more embodiments, other modifications of the initial file structure 301 may be used to insert the token 300 to produce the customized file structure 303 of the customized application package 108 without affecting the hash value of the package. For example, modifications to file attributes, creation of special file types, creation of special directories may result in a customized application package 108 with a hash value equal to the initial application package 106, and/or any other metadata.

In one or more embodiments, two or more tokens 109 are provided in an application package. The two or more tokens 109 may provide one or more types of context information. The application may be configured to perform one or more context-specific functions based on the two or more tokens 109. One or more tokens 109 may be inserted into one or more empty directories. Each token may be associated with a different context.

In one or more embodiments, multiple tokens 109 are inserted into one empty directory. The tokens 109 may be combined into a single string of characters in the name information of the empty directory. The distribution platform 102 and/or the client device 116 may include functionality to read each of the multiple tokens 109 by detecting start points and/or end points. For example, detecting connecting characters within the single string of characters. For example, a first token (e.g., "a1b2c3") and a second token (e.g., "d4e5f6") may be separated by a delimiter (e.g., "&") in a single string of characters (e.g., "a1b2c3&d4e5f6"). An identifier (e.g., "token=") may be used to indicate the beginning of the tokens. Continuing with the previous example, the tokens 109 may be inserted in name information of the empty directory as "token=a1b2c3&d4e5f6" or "token=a1b2c3&token=d4e5f6".

The token 109 may be the entire name information of the empty directory or may be a portion of the name information of the empty directory. It should be understood that the start points and/or end points can be determined by other methods. For example, by predefined start points and/or end points. Although the described examples refer to name information of an empty directory, it should be understood that the directory need not be empty if the token is inserted into name information of an existing directory of the initial application package 106 that contained files or subdirectories.

In one or more embodiments, one or more tokens 109 are provided in multiple directories within the file structure of the customized application package 108. For example, a customized application package 108 may include multiple applications therein, where each application is provided in a separate directory. An empty directory with a token 109 in its name information may be created in each application directory. In another example, a single token may be distributed across multiple directories (e.g., because the token is too lengthy to be contained by one directory).

Figure 4B:
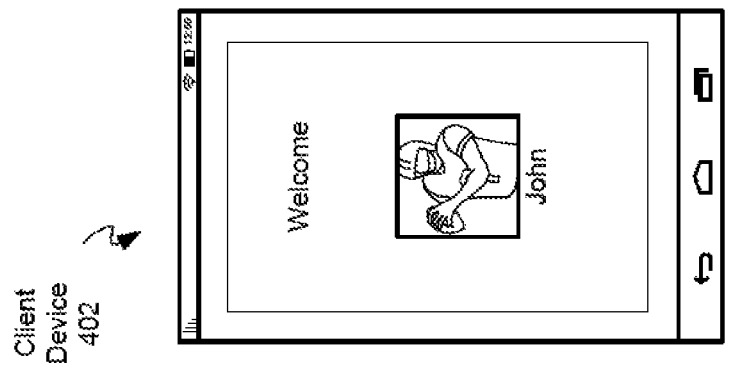
FIG. 4B shows an example of a visual representation of a client device authenticating an application associated with a customized application package.
Figure 4A:
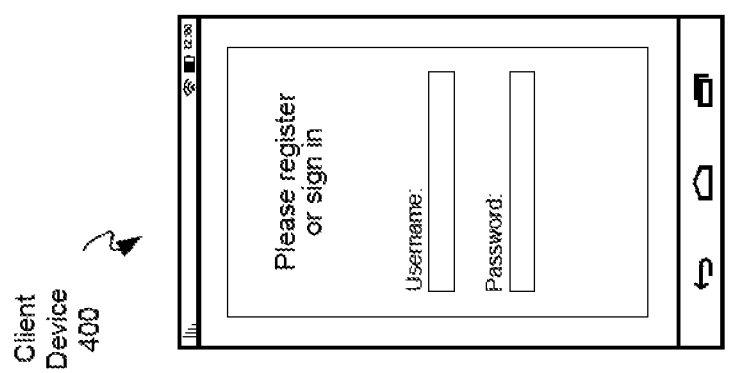
FIG. 4A shows an example of a visual representation of a client device authenticating an application associated with an initial application package.

FIG. 4A shows an example of a visual representation of a client device 400 authenticating an application associated with an initial application package. Applications commonly require users to authenticate themselves for access to their accounts on various services. The authentication process typically involves providing account information, such as a username and/or a password. Account information associated with the user's account is usually manually submitted by the user upon the first execution of the application. The authentication process may be burdensome to users who may forget their account information or find the step of providing account information to be undesirable.

FIG. 4B shows an example of a visual representation of a client device 402 authenticating an application associated with a customized application package. The customized application package 108 may include a token 109 associated with a context of the application. The token 109 may be operable to configure the application according to the context. In one or more embodiments, the context may be associated with an authentication process of the application. For example, the token 109 may include information associated with an account of a user. Thus, the token 109 may be operable to authenticate the user without requiring the user to manually input account information. As shown, the token 109 may include information associated with the account of a user "John" so as to allow user "John" to be authenticated without manually entering account information. As a result, the manual input of account information may not be required at the first execution of the application and/or subsequent execution of the application.

Figure 5:
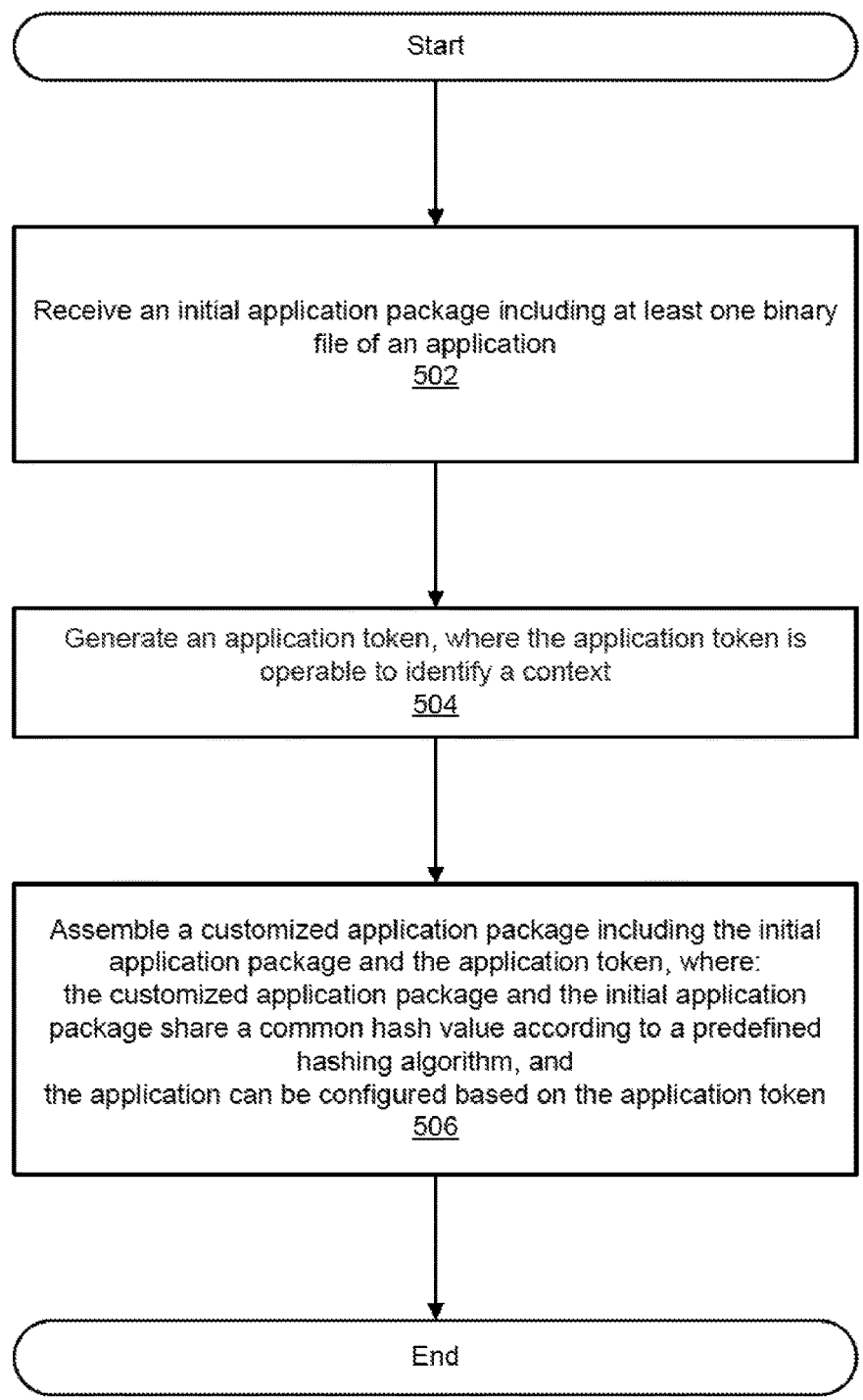
FIG. 5 shows a flowchart in accordance with one or more embodiments.

FIG. 5 shows a flowchart in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In Step 502, an initial application package including at least one binary file of an application is received. The initial application package may be received by an assembler module. The assembler module may be provided within a distribution platform or a client device. In one or more embodiments, the context-specific functionality may be identified by the token. The context-specific functionality performed by the application may include identifying a user, identifying a client device, authenticating a user, authenticating a client device, detecting an advertisement conversion, fetching parameters, and/or auto-populating fields.

In Step 504, an application token is generated, where the application token is operable to identify a context. The token may be generated by including context-specific functionality into name information of a directory in the file structure of the customized application package. The application may include functionality to read the name information of the directory to detect the token. In one or more embodiments, the name information of the directory may include a plurality of tokens.

In Step 506, a customized application package including the initial application package and the application token is assembled, where the customized application package and the initial application package share a common hash value according to a predefined hashing algorithm and the application can be configured based on the application token. The initial application package may be decompressed to provide access to an initial file structure. The token may be inserted into an initial file structure of the initial application package to produce a customized file structure. In one or more embodiments, an empty directory may be created in the initial file structure to insert the token and produce a customized file structure. In one or more embodiments, an existing directory of the initial file structure may be renamed to insert the token and produce a customized file structure. After inserting the token, the customized file structure may be compressed to form the custom application package.

A validation hash value for the initial application package may be calculated using the predefined hashing algorithm. The validation hash value may be calculated by the distribution platform or a third party server. The validation hash value may be received by a client device. The predefined hashing algorithm may be implemented such that the token does not affect the hash value it calculates. Thus, the verification hash value calculated for the customized application package may share a common hash value with the validation hash value calculated for the initial application package.

Figure 6:
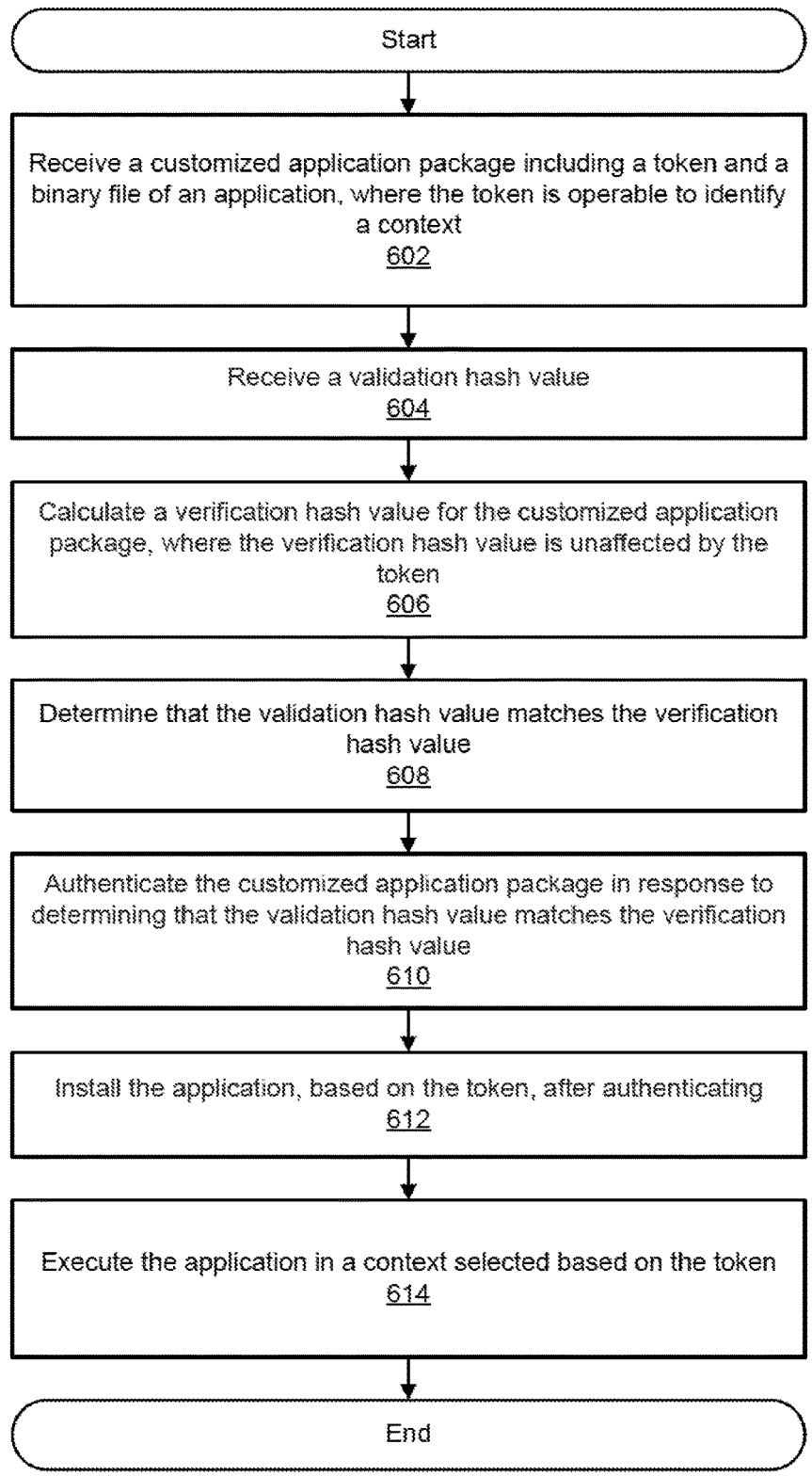
FIG. 6 shows a flowchart in accordance with one or more embodiments.

FIG. 6 shows a flowchart in accordance with one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope of the invention.

In Step 602, a customized application package including a token and a binary file of an application is received, where the token is operable to identify a context. The at least one binary file may include any type of data encoded in binary form for storage and/or processing purposes. The at least one binary file may include an executable program of the application. The at least one binary file may include an installer. The token may be included in name information of an empty directory inserted into the file structure of the customized application package.

In Step 604, a validation hash value is received. The validation hash value may be calculated and/or stored on the distribution platform or a third party server. The validation hash value may be received using a communications network. The validation hash value may be representative of a genuine application package.

In Step 606, a verification hash value for the customized application package is calculated, where the verification hash value is unaffected by the token. The verification hash value may be calculated using a predefined hashing algorithm. The predefined hashing algorithm may be a cryptographic hash function based on a message-digest algorithm.

In Step 608, the validation hash value is determined to match the verification hash value. The token may be inserted into the customized application package such that the predefined hashing algorithm is unaffected. In one or more embodiments, the predefined hashing algorithm may be unaffected by the creation of an empty directory. Thus, the creation of an empty directory with name information including the token to form the customized application package may not affect the hash value of the customized application package.

In Step 610, the customized application package is authenticated in response to determining that the validation hash value matches the verification hash value. A verification hash value that matches the validation hash value may be indicative of a genuine application package. Thus, the customized application package may be determined to be genuine and authenticated accordingly.

In Step 612, the application is installed, based on the token, after authenticating. The application may be installed using an installer provided in the application or by a system installer. Any of the provided installer and the system installer may require the application to be authenticated prior to installation. With the matching verification hash value and validation hash value, the application may be properly authenticated, thereby allowing for the application to be installed.

In Step 614, the application is executed in a context selected based on the token. The application may include functionality to decode the token and perform context-specific functionality identified in the token. The context-specific functionality performed by the application may include identifying a user, identifying a client device, authenticating a user, authenticating a client device, detecting an advertisement conversion, fetching parameters, and/or auto-populating fields.

The following is an example of one or more embodiments. For the following example, consider the scenario in which a beta tester of an application receives an initial application package from a distribution platform through a communications network. The installer of the client device associated with the beta tester, or the distribution platform, may include an assembler module operable to insert a token identifying the beta tester and/or information associated with the beta tester into the initial application package to create a customized application package. The installer may configure the application based on the token during installation. According, the application may be preconfigured according to context information contained in the token. During beta testing of the application, the application automatically sends information associated with the beta tester and/or the client device in response to a crash to the distribution platform. The distribution platform may provide the information related to the crash to the developers of the application. The crash reports provide the developers with relevant information to assess risks and take corrective actions.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments of the invention may be implemented on virtually any type of computing system regardless of the platform being used. Examples of such a computing system can include one or more mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 7:
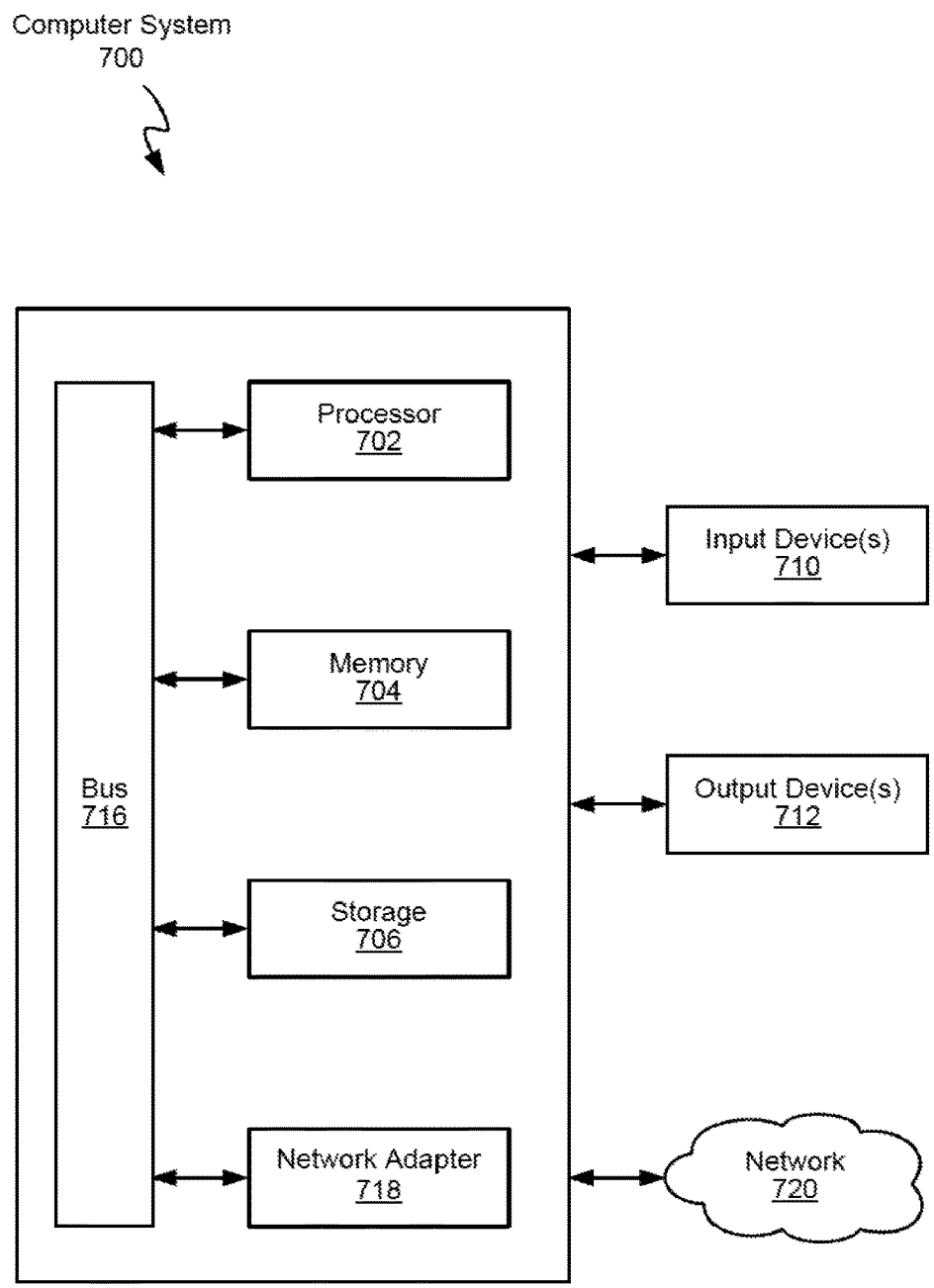
FIG. 7 shows a computer system in accordance with one or more embodiments of the invention.

For example, as shown in FIG. 7, the computing system 700 may include one or more computer processor(s) 702, associated memory 704 (e.g., random access memory (RAM), cache memory, flash memory, etc.), one or more storage device(s) 706 (e.g., a hard disk, an optical drive such as a compact disk (CD) drive or digital versatile disk (DVD) drive, a flash memory stick, etc.), a bus 716, and numerous other elements and functionalities. The computer processor(s) 702 may be an integrated circuit for processing instructions. For example, the computer processor(s) may be one or more cores or micro-cores of a processor.

The computing system 700 may also include one or more input device(s) 710, such as a touchscreen, keyboard, mouse, microphone, touchpad, electronic pen, or any other type of input device. Further, the computing system 700 may include one or more output device(s) 712, such as a screen (e.g., a liquid crystal display (LCD), a plasma display, touchscreen, cathode ray tube (CRT) monitor, projector, or other display device), a printer, external storage, or any other output device. The computing system 700 may be connected to a network 720 (e.g., a local area network (LAN), a wide area network (WAN) such as the Internet, mobile network, or any other type of network) via a network interface connection 718. The input and output device(s) may be locally or remotely connected (e.g., via the network 720) to the computer processor(s) 702, memory 704, and storage device(s) 706.

One or more elements of the aforementioned computing system 700 may be located at a remote location and connected to the other elements over a network 720. Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1 and 2) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1 and 2) and/or flowcharts (e.g., FIGS. 5 and 6). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set.

In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A method comprising:
   receiving, at an application distribution platform, an initial application package comprising one or more files of an application;
   obtaining, at the application distribution platform, an application token specific to a user account, the application token providing a context-specific functionality to the application, wherein the context of the application token includes information specific to the user account;
   assembling, by an assembler module of the application distribution platform, a customized application package comprising the initial application package and the application token, wherein assembling the customized application package includes incorporating the token into a directory structure of the initial application package; and
   providing, to a client device, the customized application package in response to a user request, wherein the customized application package is configured to configure the application during installation according to the context specified by the application token, including incorporating the information specific to the user account to preconfigure the installed application.

2. The method of claim 1, wherein assembling the customized application package comprises:
   generating an empty directory in a file structure of the initial application package; and
   inserting the application token into the empty directory.

3. The method of claim 1, wherein assembling the customized application package comprises:
   renaming an existing directory of a file structure of the initial application package; and
   inserting the application token into the renamed directory.

4. The method of claim 1, wherein the application token includes the context-specific functionality in the name information of an empty directory in a file structure of the customized application package.

5. The method of claim 1, wherein the application token is obtained from a token repository comprising a plurality of tokens, wherein each token is associated with a particular user account.

6. The method of claim 1, comprising compressing the customized application package after assembly, the compressed application package including the one or more files of the application and the application token.

7. The method of claim 1, wherein the application token includes encoded information associated with a user of the particular user account.

8. The method of claim 7, wherein the encoded information includes preference information for the user.

9. The method of claim 1, wherein the context-specific functionality based on the application token includes authenticating a user without manual login by the user at the client device.

10. The method of claim 1, wherein the customized application package includes an installer, wherein the installer configures the application during installation according to the application token.

11. The method of claim 1, wherein the customized application package and the initial application package share a common hash value.

12. The method of claim 1, wherein assembling the customized application package comprises obtaining a second application token that provided a second context-specific functionality to the application and incorporating the second token into the directory structure of the initial application package.

13. A system comprising:
    one or more computers configured to perform operations comprising:
      receiving an initial application package comprising one or more files of an application;
      obtaining an application token specific to a user account, the application token providing a context-specific functionality to the application, wherein the context of the application token includes information specific to the user account;
      assembling a customized application package comprising the initial application package and the application token wherein assembling the customized application package includes incorporating the token into a directory structure of the initial application package; and
      providing, to a client device, the customized application package in response to a user request, wherein the customized application package is configured to configure the application during installation according to the context specified by the application token, including incorporating the information specific to the user account to preconfigure the installed application.

14. The system of claim 13, wherein assembling the customized application package comprises:
    generating an empty directory in a file structure of the initial application package; and
    inserting the application token into the empty directory.

15. The system of claim 13, wherein assembling the customized application package comprises:
    renaming an existing directory of a file structure of the initial application package; and
    inserting the application token into the renamed directory.

16. The system of claim 13, wherein the application token includes the context-specific functionality in the name information of an empty directory in a file structure of the customized application package.

17. The system of claim 13, wherein the application token is obtained from a token repository comprising a plurality of tokens, wherein each token is associated with a particular user account.

18. The system of claim 13, comprising compressing the customized application package after assembly, the compressed application package including the one or more binary files of the application and the application token.

19. The system of claim 13, wherein the application token includes encoded information associated with a user of the particular user account.

20. The system of claim 19, wherein the encoded information includes preference information for the user.

21. The system of claim 13, wherein the context-specific functionality based on the application token includes authenticating a user without manual login by the user at the client device.

22. The system of claim 13, wherein the customized application package includes an installer, wherein the installer configures the application during installation according to the application token.

23. One or more non-transitory computer readable storage media comprising instructions that when executed by one or more processors perform operations comprising:
- receiving an initial application package comprising one or more binary files of an application;
- obtaining an application token specific to a user account, the application token providing a context-specific functionality to the application, wherein the context of the application token includes information specific to the user account;
- assembling a customized application package comprising the initial application package and the application token, wherein assembling the customized application package includes incorporating the token into a directory structure of the initial application package; and
- providing, to a client device, the customized application package in response to a user request, wherein the customized application package is configured to configure the application during installation according to the context specified by the application token, including incorporating the information specific to the user account to preconfigure the installed application.

* * * * *